United States Patent
Bazan et al.

(10) Patent No.: US 9,812,005 B1
(45) Date of Patent: Nov. 7, 2017

(54) METHOD FOR CREATING A ROLLING CODE RADIO CONTROL

(71) Applicant: SILCA S.P.A., Vittorio Veneto (IT)

(72) Inventors: Francesco Bazan, Treviso (IT); Roberto Gusmeroli, Colle Umberto (IT)

(*) Notice: Subject to any disclaimer, the term of this patent is extended or adjusted under 35 U.S.C. 154(b) by 0 days.

(21) Appl. No.: 15/510,676

(22) PCT Filed: Sep. 17, 2015

(86) PCT No.: PCT/IB2015/057154
§ 371 (c)(1),
(2) Date: Mar. 10, 2017

(87) PCT Pub. No.: WO2016/042509
PCT Pub. Date: Mar. 24, 2016

(30) Foreign Application Priority Data

Sep. 19, 2014 (IT) ............................... VE2014A0051

(51) Int. Cl.
| | | |
|---|---|---|
| *G05B 23/02* | (2006.01) | |
| *G08C 17/02* | (2006.01) | |
| *H04B 5/00* | (2006.01) | |
| *G01D 7/06* | (2006.01) | |
| *G07C 9/00* | (2006.01) | |

(52) U.S. Cl.
CPC ............... *G08C 17/02* (2013.01); *G01D 7/06* (2013.01); *G07C 9/00174* (2013.01); *H04B 5/0031* (2013.01); *G08C 2201/21* (2013.01); *G08C 2201/93* (2013.01)

(58) Field of Classification Search
CPC ................ G08C 17/02; G08C 2201/21; G08C 2201/93; G01D 7/06; G07C 9/00174; H04B 5/0031
USPC .......................................................... 340/3.7
See application file for complete search history.

(56) References Cited

U.S. PATENT DOCUMENTS

| | | | |
|---|---|---|---|
| 7,839,263 B2 * | 11/2010 | Shearer ................... | G08C 17/02 340/12.28 |
| 2006/0181428 A1 * | 8/2006 | Blaker .................... | B60R 25/24 340/4.3 |
| 2007/0152798 A1 * | 7/2007 | Witkowski ............. | G08C 17/02 340/5.26 |
| 2007/0197172 A1 * | 8/2007 | Witkowski ............. | G08C 17/02 455/126 |

(Continued)

*Primary Examiner* — Naomi Small
(74) *Attorney, Agent, or Firm* — Themis Law

(57) ABSTRACT

A method for creating, with an unset radio control provided with a NFC device, an adjunct rolling code radio control controlling a user device, with which an original radio control is already associated having a rolling code based on a variation algorithm unknown by the unset radio control, wherein includes identifying the algorithm via a sniffer provided with a NFC device. If the sniffer possesses the algorithm, then the algorithm is transmitted via NFC from the sniffer to the unset radio control; if instead the sniffer does not possess the algorithm, it acquires the algorithm with an apparatus connectable to the internet and provided with a NFC device, then transmits the algorithm via NFC from the apparatus to the unset radio control. The original and the unset radio control are simultaneously activated such that the original radio control can set up the unset radio control based on the algorithm.

13 Claims, 2 Drawing Sheets

(56) References Cited

U.S. PATENT DOCUMENTS

Figure 1:
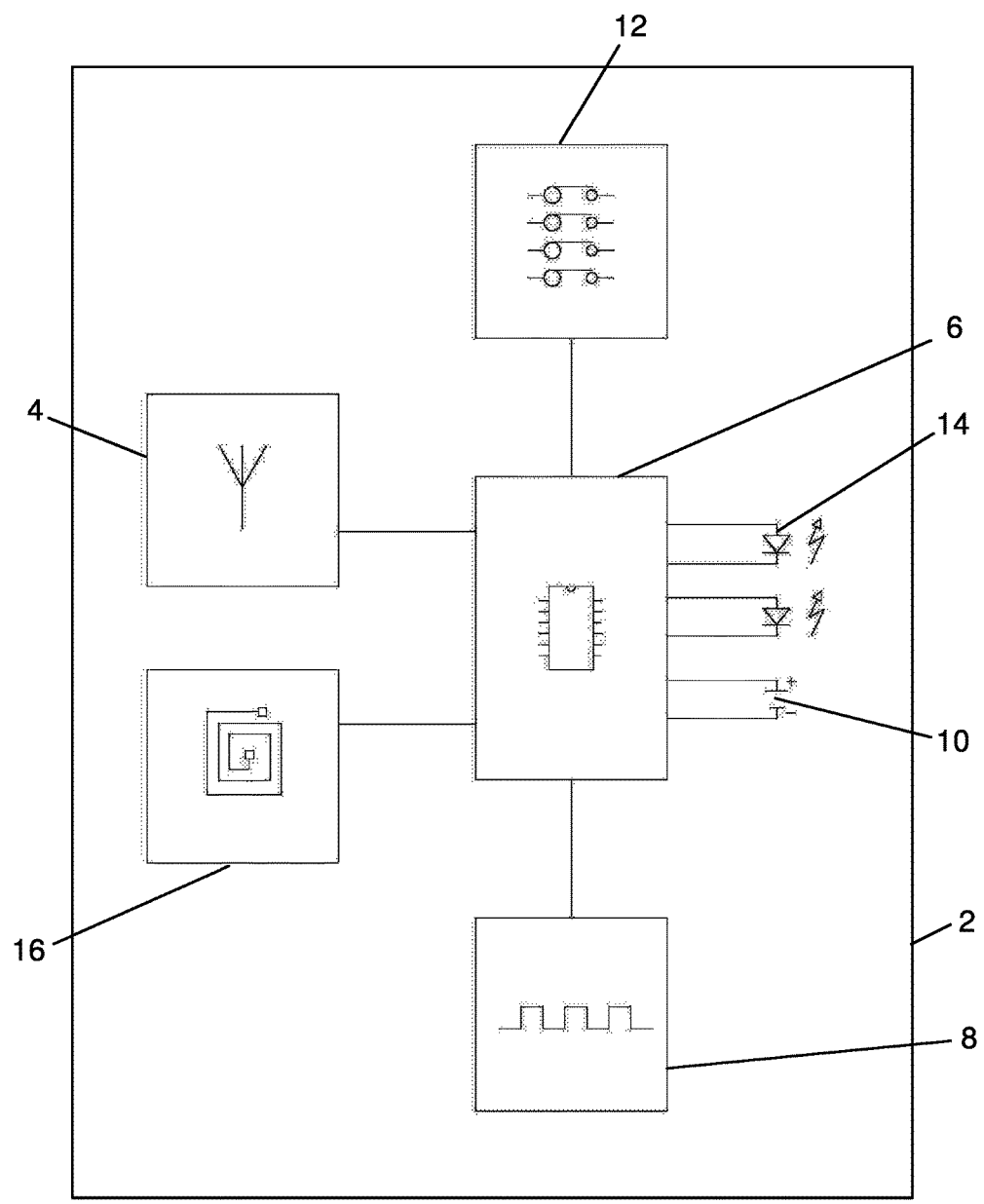

| | | | |
|---|---|---|---|
| 2009/0128392 A1* | 5/2009 | Hardacker | H04L 63/0428 341/175 |
| 2016/0145902 A1* | 5/2016 | Kalous | E05B 47/0001 700/275 |

\* cited by examiner

METHOD FOR CREATING A ROLLING CODE RADIO CONTROL

The present invention relates to a method for producing an improved rolling code radio control usable for motorized barriers (doors, entrances, gates, shutters, etc.) or for motor vehicles.

The invention also relates to a radio control obtained by this method, to an apparatus for creating said radio control and to a system for its configuration.

Radio operated remote controls for remotely operating any type of user device are known. In order to ensure communication unambiguousness with the user device to be controlled, they are provided with a specific code, which was previously a fixed code, but has latterly been replaced by a rolling code to increase security.

Adjunct radio controls often have to be created able to communicate with the user device to be controlled, but this operation can be easily achieved using an unset fixed code radio control, however it can be more difficult with an unset rolling code radio control, as this unset radio control has to be provided with a suitable rolling code algorithm which is already in possession of the user device control system and of all other radio controls which already operate with it.

Consequently, if this unset radio control possesses this algorithm, this new radio control can be created without difficulty, by simply setting the unset radio control, or that particular key of the unset radio control, such as to arrange it to operate with that algorithm chosen from several algorithms which may be present in its memory. In contrast, if the unset radio control does not possess this algorithm, an adjunct radio control cannot be created by a normal duplication centre, but instead requires the unset radio control to be despatched to its manufacturer to enable this algorithm to be loaded, or to enable that radio control to be replaced by one also containing that algorithm.

US 2014/0218165 describes a method for programming an unset radio control by an external configuration device able to dialogue with the unset radio control to be programmed by means of a plurality of different transmission modes, such as radiofrequency (RF), infrared (IR), visible light, ultrasound, and by a generic inductive coupling not specified in detail.

These transmission modes, including the generic inductive coupling, generally operate when the transmitter and receiver are at a certain distance apart (greater than 10 cm). This is a drawback in security terms as it gives rise to a high and undesirable risk of interception of the codes (which represent private personal information) transmitted by the external configuration device to the unset radio control.

Faced with this state of the art, an object of the invention is to be able to create a rolling code radio control, as adjunct to an original radio control able to operate with a certain user device, starting from an unset radio control without the rolling code algorithm characteristic of that original radio control.

Another object of the invention is to be able to create this adjunct rolling code radio control without having to materially despatch it to its manufacturer or to other sources in possession of that specific rolling code algorithm.

Another object of the invention is to create this adjunct rolling code radio control quickly and simply while safeguarding the security of the transmitted data.

These and other objects which will be apparent from the ensuing description are attained according to the invention by a method as defined in claim 1, by a radio control as defined in claim 11, by an apparatus for creating the radio control as defined in claim 15, and by a system for configuring the radio control as defined in claim 16.

Figure 2:
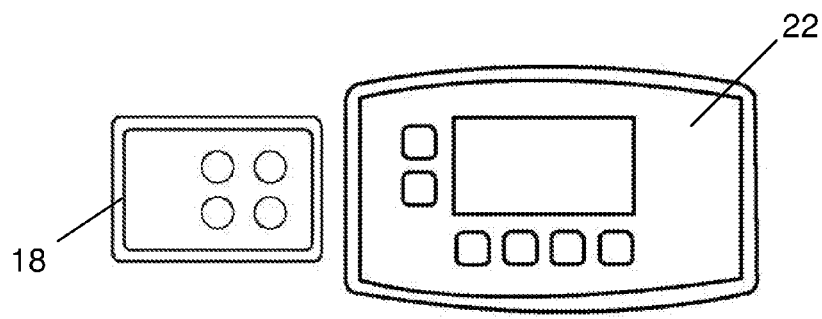
Figure 3:
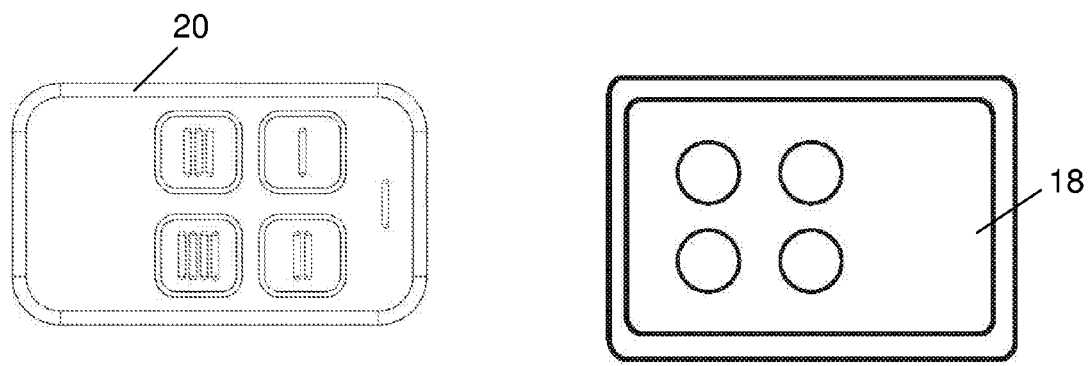
Figure 4:
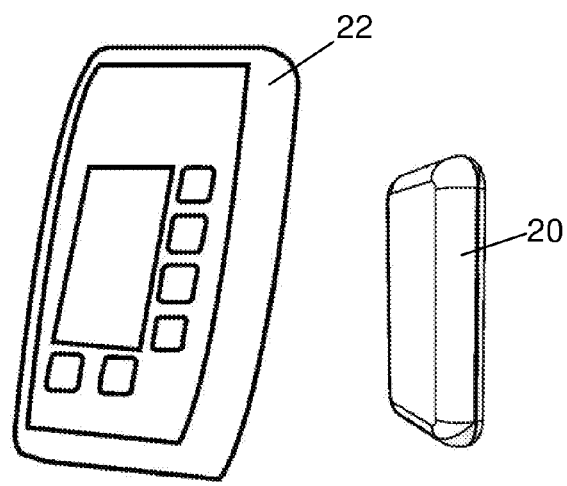

The present invention is further clarified hereinafter in terms of a preferred embodiment with reference to the accompanying drawings, in which:

FIG. 1 shows a block diagram of a rolling code radio control according to the invention, FIG. 2 shows schematically the step of recognizing the rolling code algorithm present in the original radio control, by means of a sniffer, FIG. 3 shows schematically the step of setting an unset radio control to the rolling code algorithm of an original radio control, and FIG. 4 shows schematically the step of memorizing the said algorithm by the sniffer in an unset radio control.

As can be seen from the figures, the radio control 2 according to the invention comprises, as does any radio control, a transmitter/receiver section 4 with relative antenna, a control unit 6 with a data memory, a generator 8 of a frequency to be used for operating the control unit 6, a power supply 10, one or more control keys 12, and one or more indicator lights 14 showing that one of these keys has been activated. An identification code ID is associated with the radio control in traditional manner.

It should be noted that the term "radio control" is used to signify herein a device used to remotely control a user device, in which the command signals are fed to the user device using radio waves as transmission means.

In contrast to traditional radio controls, the radio control according to the invention also comprises an NFC (near field communication) device 16. It is traditional, but has never been used as an integral part of a radio control and in particular for the purposes achieved in this specific application.

In greater detail, the control unit 6 with the data memory can be for example of the M24SR family by ST Microelectronics and implement the NFC Forum type 4 TAG and ISO/IEC 14443 Type A protocol.

The radio control 2 according to the invention is of rolling code type, meaning that the code transmitted to the user device varies at each use (transmission) on the basis of a certain algorithm memorized in the control unit 6 of the radio control itself. The same algorithm is evidently also present in the control system (not shown) of the user device to be controlled by the radio control 2, such that there is always a biunique variable correspondence between this and the control system.

For example, the code transmitted by the radio control is generated by a suitable algorithm and corresponds to a synchronism value or to a number which is incremented at each transmission. Hence the receiver unit associated with the user device, after receiving the code, evaluates it such as to operate the corresponding user device only if this code is greater than the last synchronism value previously received.

If the radio control 2 has several control keys 12, different fixed code or rolling code channels can be associated therewith, these latter in their turn being associated with different algorithms able to establish communication biuniqueness between each key and the control system of the corresponding user device. In this case an indicator light 14 can be provided for each key 12 or a number of indicator lights 14 less than the number of keys 12 and different modes of activating the same indicator light for different keys.

If an adjunct radio control of an original radio control 18 needs to be created able to control the same user device with the same rolling code algorithm, the presence of this algorithm must firstly be verified in the unset radio control 20 to be used to create the adjunct radio control and, if this presence is not verified, the unset radio control 20 must be made to acquire this algorithm.

To effect this operation the original radio control 18 is firstly activated with a sniffer 22 (see FIG. 2), i.e. with a passive interception device able to receive by radio from the original radio control 18 the signals emitted thereby and to recognize their characteristics. Preferably to effect this operation, the two radio controls 18 and 20 are brought suitably close to each other to prevent any interception by non-authorized devices.

Consequently, in contrast to traditional sniffers, the sniffer 22 used according to the invention is also provided with an NFC device, which can be used to transfer to the adjunct radio control the detected transmission characteristics and, if not already present, the operational algorithms.

In greater detail, the sniffer 22 comprises an NFC module (for example the writer PN532) able to support smartcards of various types deriving from the standard ISO/IEC 14443 Type B (for example, ISO/IEC 18092 NFCIP-1, Felica, Mifare, etc.).

If the original radio control 18 is also provided with an NFC device, said communication and setting data transmission between the original radio control 18 and the sniffer 22 can take place suitably via NFC.

In creating the adjunct radio control with rolling code, distinction must be made between the case in which the algorithm of the original radio control 18 is already stored in the sniffer 22, and the case in which this is not so.

If this algorithm has already been stored in the sniffer 22, on activating the original radio control 18, the sniffer 22 is able to recognize the rolling code algorithm, and if the unset radio control 20 already contains the algorithm, the two radio controls 18 and 20 have merely to be brought suitably together (FIG. 3) and be activated for the unset radio control 20, after receiving via radio the coded signal from the original radio control 18, to define in its interior the rolling code algorithm and set this up.

If the original radio control 18 is also already provided with an NFC device, said coded signal can be opportunely transmitted by the original radio control 18 to the unset radio control 20 via NFC once said radio controls have been brought to a sufficient distance apart to enable NFC transmission.

If instead this algorithm has not been already stored in the unset radio control 20, according to the invention it acquires it from the sniffer 22, this operation taking place via the NFC device after the unset radio control 20 has been brought close (at a distance substantially of 3-5 cm) to the sniffer 22 (see FIG. 4) and both have been activated by known procedures implemented within them. Subsequently, when that algorithm has been transmitted via NFC by the sniffer 22 and acquired by the memory of the unset radio control 20, the setting procedure for this or for a particular key thereof takes place in the manner already described for activating the unset radio control 20 and the original radio control 18 maintained close together (see FIG. 3).

When the unset radio control 20 has been set to use that algorithm, it is ready to operate as an adjunct radio control of the original radio control 18, after its ID has been stored in traditional manner in the user device control system.

If instead the sniffer 22 does not possess the rolling code algorithm used in the original radio control 18, the duplication centre approached by the user to obtain an adjunct radio control must be connected, via internet, for example by means of the sniffer, or a smartphone or a tablet provided with an NFC device, to the unset radio control manufacturer or to another subject possessing all known encryption algorithms, and cause these to transmit the particular algorithm used in the original radio control 18. Naturally all these apparatus connectable to the internet must be provided with applications suitable for the purpose.

Subsequently the unset radio control 20 can be brought close to the sniffer 22 or to the smartphone or to the tablet provided with the NFC device, i.e. to the apparatus which has downloaded that algorithm from the internet, and in this manner can acquire it via NFC for close communication.

Finally, again in this case, the setting procedure for the unset radio control or for a particular key thereof follows that already described for activating the unset radio control 20 and the original radio control 18 held close together (see FIG. 3) by transmitting the setting signal via radio or NFC.

NFC technology is particularly secure as it uses simple secure pairing (SSP) and Wi-Fi protected setup (WPS) protocols for communication between the devices.

Advantageously, to further increase security in all the aforesaid transmissions using NFC technology, the transmitted data are encrypted by suitable encryption algorithms.

In all the aforedescribed cases, setting the unset radio control 20, i.e. feeding the starting data to which the algorithm is to be applied, is achieved on the basis of the information fed by the original radio control 18 following its activation. In this respect, the setup data can be fed by the original radio control 18 to the duplicate unset radio control 20 by radio transmission between the two or, preferably, in the case of an original radio control provided with an NFC device, by NFC technology coupling.

According to the present invention the unset radio control 20 can also be made to acquire not only the rolling code algorithm (as aforedescribed), but also new or different settings, for example to associate new functions with one or more keys 12, to modify the flashing of the indicator lights 14, or to differently organize the radio control memory space, etc.

As non-limiting explanation and exemplification, a presentation is given hereinafter of the detailed sequence of steps according to the invention for configuring the unset radio control 20 by means of the sniffer 22.

Initially, the sniffer 22 receives, either from the original radio control 18 or as download from the internet, a series of data containing the algorithm to be duplicated or other information regarding the manner in which the radio control must behave when a specific key is pressed.

The sniffer 22 then carries out the following operations:
- it encrypts the data bank to be despatched,
- it creates, in accordance with the specific NFCs, a header valid for the type of data to be dispatched,
- it associates the encrypted data bank with the NFC header such as to obtain an NFC data structure compatible with the specific Forum Type 4 NFC,
- it inserts the thus created NFC structure into an ISO14443A structure,
- it opens an NFC connection and despatches everything to the unset radio control 20.

The management of the physical transmission protocol, congruence monitoring and management of the low level dialogue are suitably carried out directly by the communication chips NFC M24SR of the unset radio remote control and PN532 of the sniffer.

The data transmitted via NFC by the sniffer 22 are written directly into the space of the memory of the unset radio control 20; in particular, this operation is managed directly by the NFC M24SR communication chip of the radio control 20, and no intervention is required by this latter, which hence remains inactivated.

The unset radio control 20 is then activated and accesses its memory contents via the ISO-14443A protocol. Hence in this manner, the radio control 20 reads the received NFC structure and extrapolates the useful encrypted data therefrom using the parameters present in the structure header. Finally, the radio control 20 decrypts the content of the encrypted data to use them to finally eliminate the previously received encrypted data previously received, which are no longer required, so making them unavailable to any unauthorized reading attempt.

The data to be duplicated is transferred by the original radio control 18 to the sniffer 22 by reception of the radio transmission activated by pressing pushbuttons or, if the original radio control 18 is provided with NFC, it follows substantially the same but inverted procedure.

Essentially, the present invention differs from US 2014/0218165 in that, from the multiple different transmission modes provided in this latter, it specifically selects only NFC technology, which is a particular type of inductive coupling which requires strict proximity between the transmitter and receiver, and in addition operates at a specific frequency (equal to 13.56 MHz) and with a specific protocol (NFC Forum Type 4, ISO/IEC14443), which is able to operate with the unset radio control not powered.

This is particularly advantageous in that transmission is made more secure, avoiding the risk of interception by sniffer devices used by hackers.

Moreover, the system of US 2014/0218165 comprises exclusively the external programming/configuration devices and the unset radio control to be programmed, without mentioning in any way the need to have available the original radio control for use in setting up the unset radio control. In particular, US 2014/0218165 does not provide for the sniffer to acquire from the original radio control the algorithm to be duplicated to then transmit it to the unset radio control, neither does it provide for setting the unset radio control by using the original radio control.

in contrast, US 2014/0277805 describes a device using NFC technology to control domestic user devices, whereas the present invention specifically relates to a rolling code radio control using radio frequency to control a particular user device. In particular, according to the present invention, NFC communication is used only during the step of configuring/programming the unset radio control, and not during its use.

The invention claimed is:

1. A method for creating, with an unset radio control (20) provided with a NFC (Near Field Communication) device (16), an adjunct rolling code radio control for controlling a user device, an original radio control (18) being already associated with the user device and having a rolling code based on a variation algorithm unknown by said unset radio control (20), comprising:
    identifying said algorithm of said original radio control (18) via a sniffer (22) provided with a NFC device;
    if said sniffer (22) possesses said algorithm, transmitting said algorithm via NFC from said sniffer (22) to said unset radio control (20); and
    if instead the sniffer (22) does not possess said algorithm, causing the sniffer to remotely acquire the algorithm with an apparatus connectable to the internet and provided with a NFC device, then to transmit the algorithm via NFC from said apparatus to said unset radio control (20),
    wherein said original radio control (18) and said unset radio control (20) are simultaneously activated such that said unset radio control is set up by the original radio control based on said algorithm.

2. The method as claimed in claim 1, wherein said unset radio control (20) further comprises a transmitter/receiver section (4) with an antenna, a control unit (6) with a data memory, a generator (8) for a frequency to be used for operating said control unit (6), a power supply (10), at least one control key (12), and at least one indicator light (14) showing that said control key (12) has been activated.

3. A method as claimed in claim 1, wherein said unset radio control (20) comprises a transmitter/receiver section (4) with an antenna, a control unit (6) with a data memory, a generator (8) for a frequency for operating said control unit (6), a power supply (10), at least one control key (12), and at least one indicator light (14) showing that said key (12) has been activated, the NFC device (16) for communicating via NFC with said sniffer (22) and/or with said unset radio control (18).

4. The method as claimed in claim 1, wherein said algorithm of said original radio control (18) is identified via said sniffer (22) by activating said original radio control (18) such that the sniffer (22) receives, via radio, signals emitted by the original radio control (18) and recognizes characteristics of said signals.

5. The method as claimed in claim 1, wherein, if the original radio control (18) is provided with the NFC device, said algorithm of said original radio control (18) is identified via said sniffer (22) by activating said original radio control (18) and maintaining in proximity of said sniffer (22), such that said sniffer receives, via NFC, signals emitted by the original radio control (18) and recognizes characteristics of said signals.

6. The method as claimed in claim 1, further comprising the step of simultaneously activating said original radio control (18) and said unset radio control (20) such that said unset radio control receives, via radio, an encoded signal from the original radio control (18), identified internally the algorithm, and is set up therewith.

7. The method as claimed in claim 1, wherein, if the original radio control (18) is provided with the NFC device, said original radio control (18) and said unset radio control (20) are simultaneously activated while remaining in proximity of each other such that said unset radio control receives via NFC an encoded signal from the original radio control (18), identifies internally the algorithm, and is set up therewith.

8. The method as claimed in claim 1, wherein said unset radio control (20) is made to acquire via NFC said algorithm by the sniffer (22), a smartphone, or a tablet.

9. The method as claimed in claim 2,
    wherein the method transforms the unset radio control (20) provided with a plurality of keys (12) associated with different transmission channels of said transmitter/receiver section, into an adjunct radio control of one or more original radio controls associated with corresponding user devices, and
    wherein, for each of said transmission channels, said unset radio control (20) is made to acquire by an autonomous acquisition procedure a respective rolling code algorithm, whereby said unset radio control (20) is then set up by the original radio control (18), the unset radio control constituting an adjunct radio control of the original radio control.

10. The method as claimed in claim 1, wherein one or more of data transmitted via NFC by said apparatus to said unset radio control (20) or data transmitted via radio or via NFC by said original radio control (18) to one or both of said apparatus or said unset radio control (20) are encrypted.

11. An apparatus for creating, with an unset radio control (20) provided with a NFC device (16), a rolling code radio control as adjunct to an original radio control (18), comprising:

a sniffer (22), a smartphone, or a tablet which are connectable to the internet and which are provided with the NFC device and a program transmitting via NFC, to said unset radio control (20), a rolling code algorithm which had been previously remotely acquired based on said original radio control (18).

12. A system for configuring a radio control (20), comprising:

a radio control configured (20) with a method for creating, with an unset radio control (20) provided with a NFC (Near Field Communication) device (16), an adjunct rolling code radio control for controlling a user device, an original radio control (18) being already associated with the user device and having a rolling code based on a variation algorithm unknown by said unset radio control (20), said method comprising:

identifying said algorithm of said original radio control (18) via a sniffer (22) provided with a NFC device;

if said sniffer (22) possesses said algorithm, transmitting said algorithm via NFC from said sniffer (22) to said unset radio control (20); and if instead the sniffer (22) does not possess said algorithm, causing the sniffer to remotely acquire the algorithm with an apparatus connectable to the internet and provided with a NFC device, then to transmit the algorithm via NFC from said apparatus to said unset radio control (20), wherein said original radio control (18) and said unset radio control (20) are simultaneously activated such that said unset radio control is set up by the original radio control based on said algorithm; and an apparatus (22) for creating, with the unset radio control (20), the rolling code radio control as adjunct to the original radio control (18), the apparatus comprising:

the sniffer (22), a smartphone, or a tablet which are connectable to the internet and which are provided with the NFC device and a program transmitting via NFC, to said unset radio control (20), the algorithm which had been previously remotely acquired based on said original radio control (18), wherein data to be configured are transmitted via NFC by said apparatus (22) to said radio control to be configured (20).

13. The system as claimed in claim 12, further comprising an original radio control (18) from which said apparatus acquired, via radio or via NFC, configuration data to be then transmitted via NFC to said radio control to be configured (20), or from which said radio control to be configured receives set-up data via radio or via NFC.

* * * * *